United States Patent [19]

Anderson

[11] Patent Number: 4,665,646
[45] Date of Patent: May 19, 1987

[54] PROTECTIVE ENCLOSURE FOR PLANTS

[76] Inventor: Richard Anderson, 25 Arnold St., Methuen, Mass. 01844

[21] Appl. No.: 764,212

[22] Filed: Aug. 9, 1985

[51] Int. Cl.⁴ ............................................. A01G 13/00
[52] U.S. Cl. ....................................................... 47/27
[58] Field of Search ................................ 47/17, 19–31, 47/44, 27

[56] References Cited

U.S. PATENT DOCUMENTS

| | | | |
|---|---|---|---|
| 1,218,326 | 3/1917 | Sheridan | 47/27 |
| 1,904,700 | 4/1933 | Starks | 47/28 |
| 1,916,868 | 7/1933 | Starks | 47/28 |
| 2,832,178 | 4/1958 | Arthurs | 47/29 |
| 2,889,664 | 6/1959 | Olshansky | 47/28 |
| 3,800,468 | 4/1974 | de Graff | 47/28 |
| 3,812,616 | 5/1974 | Koziol | 47/17 |
| 4,265,300 | 5/1981 | Kurimoto | 47/17 |

FOREIGN PATENT DOCUMENTS

| | | | |
|---|---|---|---|
| 1292483 | 3/1962 | France | 47/28 |
| 2436856 | 5/1980 | France | 47/29 |
| 13276 | of 1885 | United Kingdom | 47/29 |
| 320004 | 10/1929 | United Kingdom | 47/31 |
| 631606 | 11/1949 | United Kingdom | 47/29 |
| 2104365 | 3/1983 | United Kingdom | 47/29 |

*Primary Examiner*—James R. Feyrer
*Attorney, Agent, or Firm*—Edward A. Gordon

[57] ABSTRACT

A protective enclosure for plants is disclosed which is particularly adapted in one mode for young plants that are disposed in rows and is easily converted to a protective mode which provides protection for larger plants and/or a support upon which plants may climb or be tied. The protective enclosure mode structure includes a row of spaced generally flat frame members which have a horizontal portion and downwardly extending lateral leg portions for insertion into the ground. Openings are disposed within the frame members to receive upper and/or lateral elongated supports which support the frame members in parallel spaced relationship without interfering with the outer surface of the frame members which serve to support a cover which is transparent to sunlight. The frame members are provided with clamps for releasably securing the cover about the frames and in ground engaging contact. The elongated supports also serve as conduits for fluids to be delivered to the plants. The frame members are provided with slots to permit easy stacking to convert the frame members to the protective mode structure.

9 Claims, 8 Drawing Figures

PROTECTIVE ENCLOSURE FOR PLANTS

FIELD OF THE INVENTION

This invention relates generally to protectors and supporters for plants and the like for shielding and sheltering or supporting growing plants during various stages of their growth, and more particularly to an improved, simple and versatile structure for protecting and enclosing young plants.

BACKGROUND OF THE INVENTION

Probably the most common way of protecting plants against damaging weather conditions and of inducing early maturity in young plants is by means of a greenhouse. Large greenhouse construction, however, is relatively expensive and the resultant structures are fixed and permanent in nature and do not lend themselves to field grown plants. For field grown plants needing protection and an environment which induces early maturity, it is common in the prior art to construct hot caps or tents, or small greenhouses, cold frames and similar structures in an extended arcuate configuration. Examples of such prior art structures are disclosed in the following U.S. Patents: U.S. Pat. Nos. 1,904,700 and 1,916,868 issued to Starks; U.S. Pat. No. 2,832,178 issued to Arthurs; U.S. Pat. No. 3,800,468 issued to deGraff; and U.S. Pat. No. 3,812,616 issued to Kozioi. While such prior art structures generally do an adequate job of protecting or covering the plants, there still exists a need for a simple low cost structure that can be assembled quickly by an unskilled person and that can be used as an extended structure for field grown plants and for the homeowner and small gardener while providing easy access to the plants for their tending; limited tending without access; and which can be readily converted to a hot cap or hot tent type structure or to a basic protective supporting structure. Accordingly, a desirable object of the present invention is to provide a plant protector structure which is readily adaptable to provide protection for row plants and individual plants during their early stages of growth, or provide a protective supporting structure for maturing or matured plants, flowers, shrubs or the like.

Another desirable object of the invention is to provide a plant shelter frame wherein the frame includes a transparent cover member arranged to protect young or growing plants from adverse conditions such as weather, insects or the like and means for dispensing water or nutrients to the plants without removing the cover to access the plants.

Another desirable object of the present invention is to provide a plant shelter frame and transparent cover member and which also includes apparatus for temperature control within the shelter.

A still further desirable object of the present invention is to provide a plant protector shelter which includes a transparent cover and apparatus which provides for easy attachment of the shelter cover therearound and for moving the cover from a position completely enclosing the shelter to position of partially opened or completely opened for desired effective ventilation.

A still further desirable object of the present invention is to provide a plant protector shelter that can be economically manufactured in a wide range of sizes and which is easy to assemble and disassemble.

Other desirable objects and advantages of the present invention will in part appear hereinafter and will in part become apparent after consideration of the specification with reference to the accompanying drawings.

SUMMARY OF THE INVENTION

The protective shelter of the present invention is particularly adapted in one mode for use with seedlings or young plants that are disposed in rows, or in smaller groups of one or more plants and is easily converted to a protective mode which provides protection for larger plants and/or a support upon which plants may climb or be tied. The shelter comprises arch members the ends of which are inserted in the ground in even or uneven spaced relationship. The upper portions of the arch members are maintained in the desired spaced relationship by an upper elongated horizontal member which is inserted in openings in the top portion of the arch members and cooperates with the arch members to maintain the arch members in the desired spaced vertical positions. In a preferred embodiment elongated lateral members are inserted in lateral openings in the arch members to provide increased rigid spaced alignment of the arch members. The upper and lateral support members and arch members are constructed and arranged so that they do not interfere with the transparent cover and provides for easy attachment or detachment of the cover. The invention provides for closure of the shelter with end enclosure arch members which are solid members and enclose opposite ends of the shelter. In accordance with the invention the upper elongated horizontal member is constructed and arranged to serve as a conduit to dispense water and nutrients to the plants, and, under certain conditions, heating fluids to the interior of the shelter.

BRIEF DESCRIPTION OF THE DRAWINGS

For a fuller understanding of the nature and desired objects of the invention, reference should be had to the following detailed description taken in connection with the accompanying drawings, wherein like reference characters refer to corresponding parts throughout the several views and wherein.

DETAILED DESCRIPTION OF THE DRAWINGS

Figure 1:
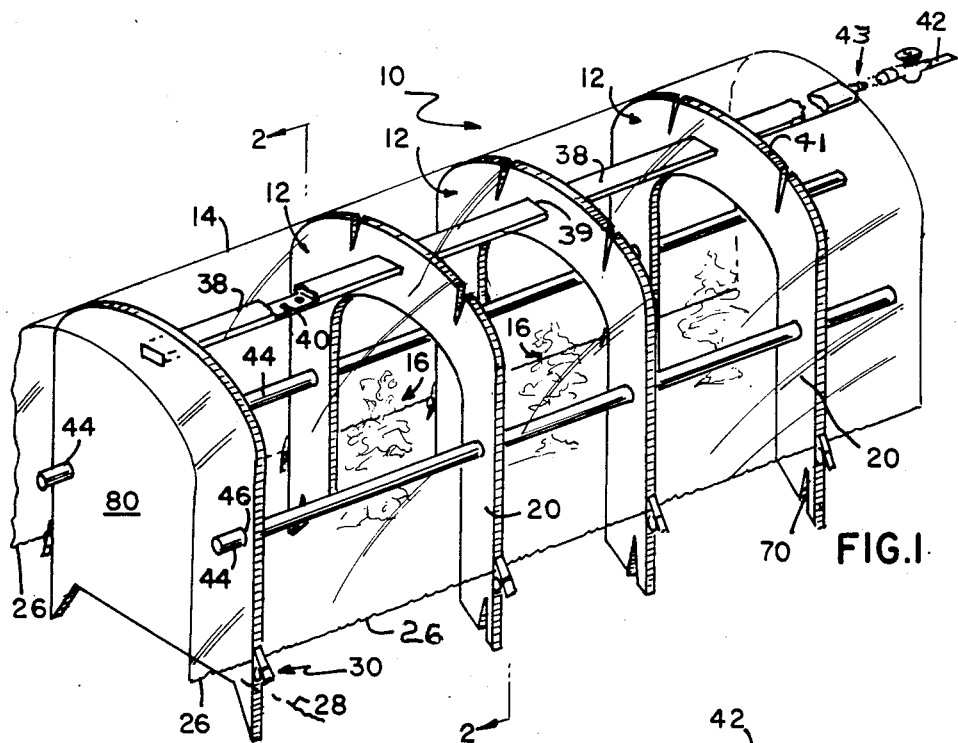
FIG. 1 is a partially fragmented perspective view of the protective plant shelter of the present invention associated with growing plants.
Figure 2:
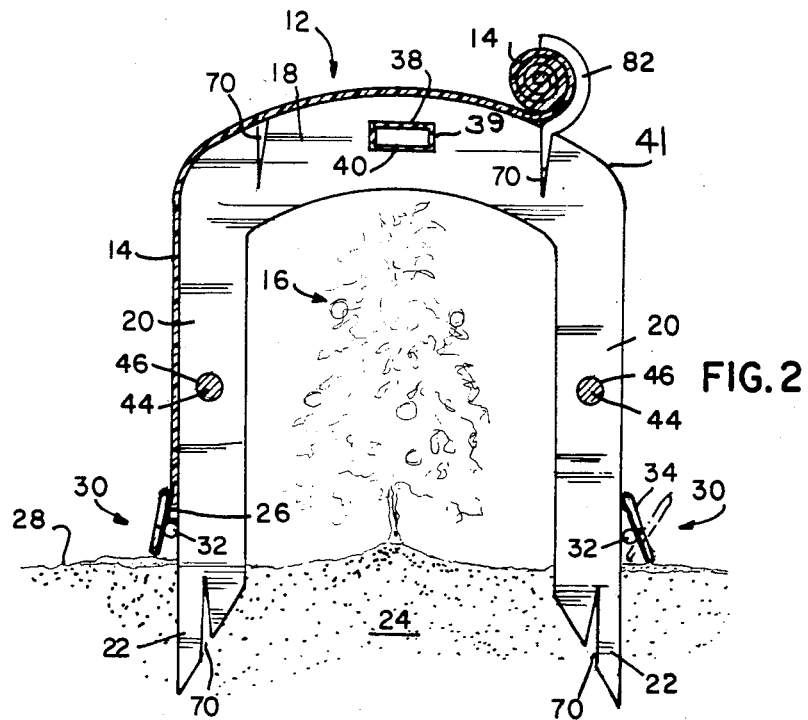
FIG. 2 is a transverse section through the shelter taken on line 2—2 of FIG. 1 and further illustrating the transparent cover in partially open position.

Referring now to FIGS. 1 and 2 of the drawing, the protective enclosure of the present invention is generally indicated at 10 and comprises a plurality or row of arch members 12 which support a cover 14. The cover 14 is preferably formed of an elongated sheet or strip of transparent or at least translucent material to induce early maturity in the plants 16 within the enclosure 10. The cover member 14 can be made out of any suitable flexible material which is transparent to sunlight such as plastic or paper. The arch members 12, also referred to as support or frame members, comprise a generally flat inverted U-shaped body having an upper bight or horizontal portion 18 and lateral leg portions 20. The leg portions 20 are provided with pointed ends portions 22 which are inserted into the ground 24 on either side of the plant row as best shown in FIG. 2.

Figure 3:
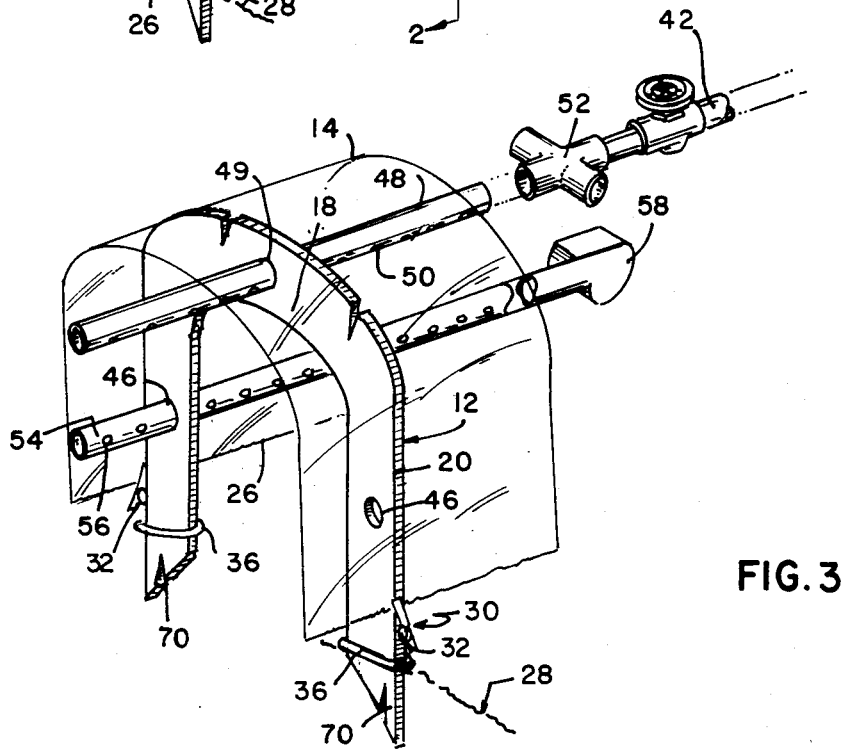
FIG. 3 is a fragmentary elevation illustrating alternate embodiments of the upper and lateral elongated support members.

In order to hold the flexible cover 14 in position about the arch members 12 and releasably maintain its longitudinal edges 26 adjacent to the ground surface 28, the lateral leg members are provided with suitable clamp means. The clamp means may be any suitable clamp means such as spring loaded clamps shown generally at 30 having a tension spring 32 secured to a clamping lever arm 34 which is activated by pressure on one end to move it to its releasable open position as shown by the dotted lines of FIG. 2. The lower portion of the clamps 30 also serve as a guide to insure that all of the arch members 12 are driven substantially the same distance into the ground and to a certain extent act as ground surface engaging stop means. In an alternate embodiment the ground surface engaging stop means such as flanges or collars 36 are disposed about at least a portion of the leg members 20 and below the clamps 30 (as shown in FIG. 3) to limit the insertion of the leg members to a predetermined debth into the ground. The upper portions 18 of the arch members 12 are held in the desired spaced relationship by an upper elongated horizontal support member 38 which is inserted in openings 39 which are preferably disposed in the center of the horizontal portion 18 of the arch members 12. The openings 39 are disposed below the outer surface 41 of the arch members 12 whereby the elongated horizontal support member 38 does not interfere with the cover 14 when in position about the outer surfaces 41 of the arch members 12. The elongated support member 38 may be rectangular in configuration as shown in FIGS. 1 and 2. When it is desired to provide fluids such as water or other liquid nutrients to the plants, the elongated horizontal support member 38 is constructed as a hollow conduit (as shown in FIGS. 1 and 2) and provided with holes or openings 40 to discharge the fluid carried therewithin. The fluid, water for example, may be provided from a suitable source such as a garden hose 42 connected to the elongated member 38 by the usual male and female couplings 43 well known to those skilled in the art. When the protective enclosure of the present invention is fabricated in larger sizes, the arch members 12 may be provided with elongated lateral support members 44 which are inserted through openings 46 in legs 20 of the arch members 12.

Referring now to FIG. 3 of the drawing there is shown modified embodiments of the elongated horizontal and lateral supports of the present invention. As shown the upper elongated support is a circular conduit 48 having discharge holes or openings 50 connected to a suitable source of water 42. The circular conduit 48 is inserted in openings 49 which are disposed in the center of the horizontal portion 18 of arch members 12. As shown a suitable joint 52 provides connection of the water source 42 to the elongated conduit members of other protective enclosures (not shown). In this embodiment of the invention, the lateral support members are formed as circular fluid conduit members 54 having discharge openings 56. The conduits 54 are connected to a suitable source of heating fluid such as hot air blower 58 which provide means for heating the interior of the protective enclosure when environmental conditions require the same to preserve the growing plants.

Figure 4:
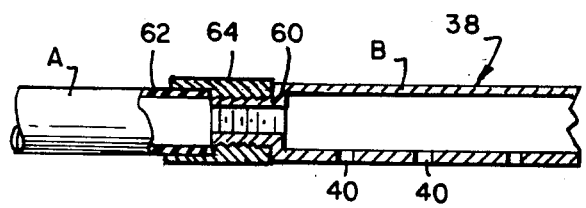
FIGS. 4 and 4A are fragmentary views of typical connections for sections of the upper and lateral support members.
Figure 4A:
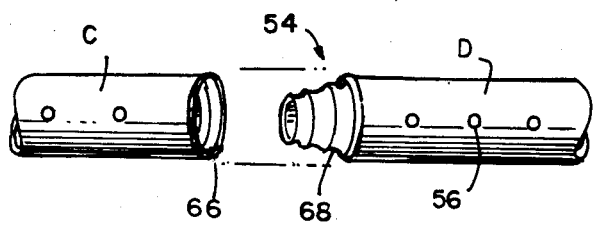

Referring now in particular to FIG. 4 there is shown the elongated upper horizontal support in sections A and B joined by suitable male and female end members 60 and 62 and suitable retaining ring cap 64. In a similar manner, referring now to FIG. 4A, the elongated circular conduit support member 54 may be fabricated in sections C and D, for example, having an internally threaded female end 66 to receive a reduced diameter threaded male end 68. When the elongated protective enclosures 10 are fabricated, the elongated members 38 and 54 can be fabricated in sections and interconnected to the desired length. Heat conduit 54 can be formed in sections and interconnected in the same manner as conduit member 54, C and D. It is to be understood that when conduction of fluids is not contemplated, the elongated upper and lateral support members may be fabricated as solid members such as rods.

Figure 5:
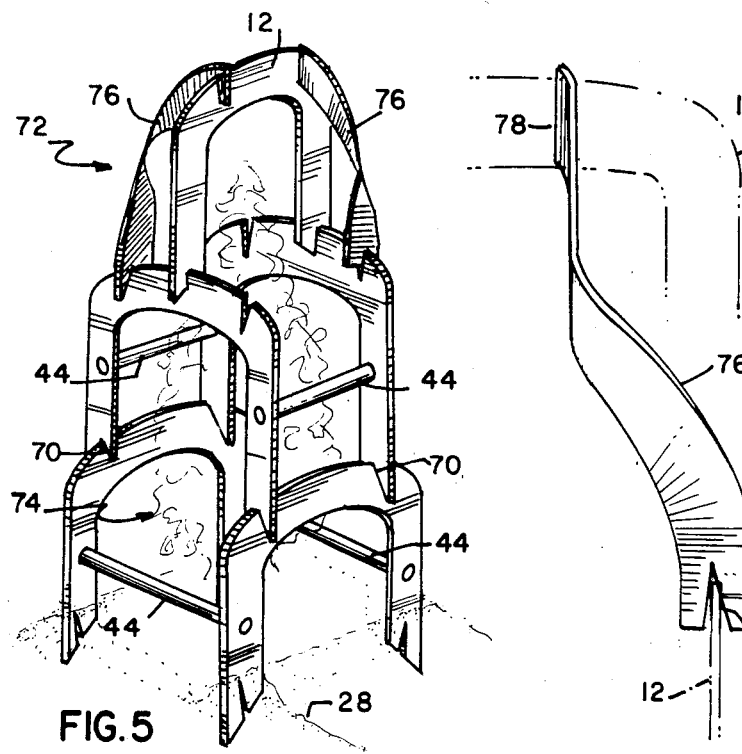
FIG. 5 is a perspective view of the invention in the mode of a protective supporting structure.
Figure 6:
FIG. 6 is an enlarged perspective view of a brace member in in accordance with the invention as illustrated in FIG. 5.

Referring now to FIG. 5, the plant protector of the present invention is shown converted to its mode as a protective support for plants and upon which plants may climb or be tied. As shown (reference also being made to FIG. 1) the frame members 12 are provided with tapered slots or openings 70 which permit quick and easy erection of a plant protector structure shown generally at 72 about a plant 74 to be protected. The tapered openings 70 permit stacking of the frames 12 upon one another by engaging the openings 70 in the leg portions 20 with the openings 70 in the horizontal portion 18 of frames 12. Lateral support members 44 can be inserted to provide additional rigidity of the frame structure 72. In a preferred embodiment brace members 76 are provided to secure the upper most frame member 12 in position. The brace members may be fabricated of flat stock material similar to frame members 12 and provided with a tapered slot 70 at one end and a flat portion 78 at the other end, the planes of the ends being disposed 90° degrees to each other. It is to be understood that the protective structure 72 may be covered with a material such as burlap, plastic and the like to provide for the protection from environmental conditions as is well known to those skilled in the art.

In use the frames 12 may be positioned as shown in FIG. 1 and the transparent cover 14 mounted on the frame members 12 and held in position thereabout by clamps 30. The protective enclosure 12 of the present invention is closed at each end by a solid frame member 80. Thus the growing plants 16 will be protected from adverse weather conditions such as cold, or wind or the like, but nevertheless, the transparent cover member 14 will permit the beneficial sun's rays to pass through the cover member 14 and provide for the efficient growing of plants. When particular plants require nutrients, such nutrients may be introduced in fluid form through the upper elongated conduit 38. In a similar manner, where the environmental temperature drops to a dangerous level, heat may be added via the lateral conduit 44. When it is desired to ventilate the plants one side of the cover is unclamped and rolled to the position as shown in FIG. 2 and held in place by retaining members 82 which are inserted into the tapered openings 70 in the upper portion of the arch members 12.

The arch members 12 can be made of suitable materials such as plastic, wood, metal or combinations thereof. The upper and lateral elongated support members when serving as conduits as well as supports can be formed of suitable materials such as plastic or metal. When such supports are solid non-conduits they can be made of suitable materials such as plastic, wood, metal or combinations thereof. Additionally when maturity of the plants and environmental conditions permit the transparent cover 14 may be replaced in whole or in part by a fine mesh screen cover (not shown) well known to those skilled in the art.

Figure 7:
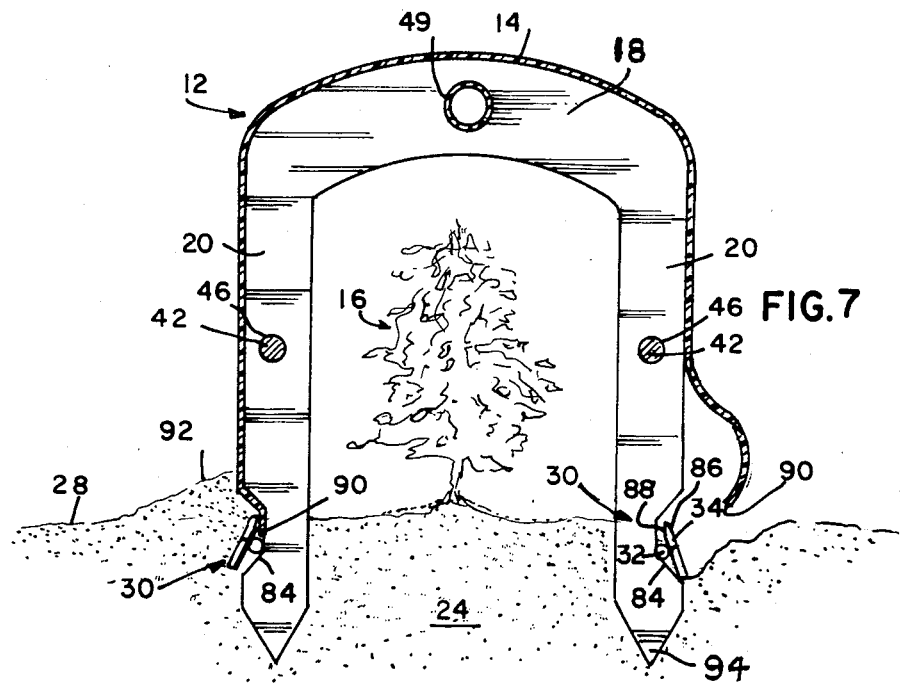
FIG. 7 is a sectional view of a modified embodiment of the arch member of FIG. 2 in accordance with the invention.

Referring now to FIG. 7 there is illustrated a modified embodiment of the arch member 12. As shown the lateral leg supports 20 of the arch member 12 are provided with recesses or openings 84 within which clamps 30 are disposed. The distal ends of clamp lever arms 34 are preferably provided with an upper rounded portion 86 and a lower flat portion 88. The round portion 86 facilitates insertion of the cover 14 under the clamp arm 34 while the flat portion 88 provides for greater contact area of clamp arm 34 upon cover 14 and the leg 20 and thereby maximizes clamping strength. The recessed clamps permit the lateral legs 20 to be inserted into the ground or soil 24 to a depth up to the rounded portion 86 of clamp arm 34. The cover edge 90 can be easily inserted under the clamp arm 34 to provide a taut holding engagement of the cover edge 90 along its length with the ground 24. The numeral 92 designates earth or soil which may be piled against the sides of the cover 14 so as to help maintain contact with the ground. In this embodiment the lateral legs 20 terminate in arrow-like pointed bottom portions 94.

While the invention has been described with respect to preferred embodiments it will be apparent to those skilled in the art that changes and modifications may be made without departing from the scope of the invention herein involved in its broader aspects. Accordingly, it is intended that all matter contained in the above description, or shown in the accompanying drawing shall be interpreted as illustrative and not in limiting sense.

What is claimed is:

1. In a combined plant protector and plant support wherein a frame structure having a base portion and an upper portion is disposed about a plant in the ground, the improvement wherein the frame comprises:
   a plurality of generally flat frame members;
   said frame member having an upper horizontal portion and a pair of downwardly extending lateral leg portions terminating in a pointed bottom portion;
   said horizontal portion and said lateral portions being integral and having an outer edge defining an outer surface and an inner edge defining an open area;
   openings disposed in said lateral leg portion;
   elongated lateral support members adapted to extend through said lateral leg openings so as to support adjacent frame members in spaced parallel relationship;
   slots disposed in spaced relationship in the outer edge of said horizontal portion; and
   slots disposed in the bottom portion of said leg portions;
   said base portion formed of a pair of spaced parallel frame members inserted in said ground;
   said upper portion formed of at least one pair of frame members disposed in spaced relationship upon the base portion;
   wherein the connections of each pair of frame members with the adjacent upper pair is formed by the slots disposed in the bottom portions of said lateral leg portions of one pair of frame members being inserted into the respective slots in the horizontal portions of the other pair of frame members and in which the spaced relationship of each pair of frame members is maintained by said elongated lateral support members.

2. The combined plant protector and plant support of claim 1 further including a top portion comprising:
   a frame member disposed upon a pair of upper frame members; and
   a pair of brace members disposed upon each side of said frame member so as to support said frame member.

3. A protective enclosure for plants disposed in a row in the ground, the enclosure comprising:
   a row of spaced, substantially parallel generally flat frame members;
   said frame members having an upper horizontal portion and a pair of downwardly extending lateral leg portions for insertion in said ground about said plant row;
   said horizontal portion and said lateral portion being integral and having an outer edge defining an outer surface and an inner edge defining an open area for general disposition about said plant row;
   an opening disposed below said outer edge in said upper horizontal portion;
   an elongated horizontal member extending through said openings of said frame members so as to support said frame members in spaced parallel relationship;
   an elongated cover member transparent to sunlight disposed about the outer surfaces of said frame members so as to be supported thereby;
   said cover member having horizontally extending edge members extending between the leg portions of said frame members;
   said lateral leg portions of said frame members having recesses formed therein;
   clamp means disposed in said recesses for releasably securing said cover member edges;
   said recesses being equally spaced from the lower ends of said leg portions to permit at least a portion of each said recesses and clamp means to be inserted in said ground; and
   end closure frame members positioned at each end of said protective enclosure member;
   said end enclosure frame members being substantially solid and having openings disposed in the upper horizontal portion to receive said elongated horizontal member.

4. The protective enclosure of claim 3 wherein said elongated horizontal support member is constructed as a fluid conduit having openings for generally downward discharge of fluids.

5. The protective enclosure of claim 3 further including;
   openings disposed in said lateral leg portions of said frame members; and
   elongated lateral support members extending through said openings.

6. The protective enclosure of claim 3 wherein said elongated lateral support member is constructed as a fluid conduit having openings for discharge of fluids.

7. The protective enclosure of claim 3 wherein said cover member is rollable about said outer surfaces of said frame members and further including: means associated with said outer surfaces for releasably holding said cover in a rolled up position upon said outer surfaces.

8. The protective enclosure of claim 3 wherein said lateral leg portions terminate in generally pointed bottom portions.

9. The protective enclosure of claim 3 wherein said lateral leg portions include means to limit the insertion of said leg portions to a predetermined depth into said ground.

* * * * *